M. E. JUOPPERI.
HARROW.
APPLICATION FILED FEB. 13, 1920.
1,389,512.
Patented Aug. 30, 1921.
2 SHEETS—SHEET 1.
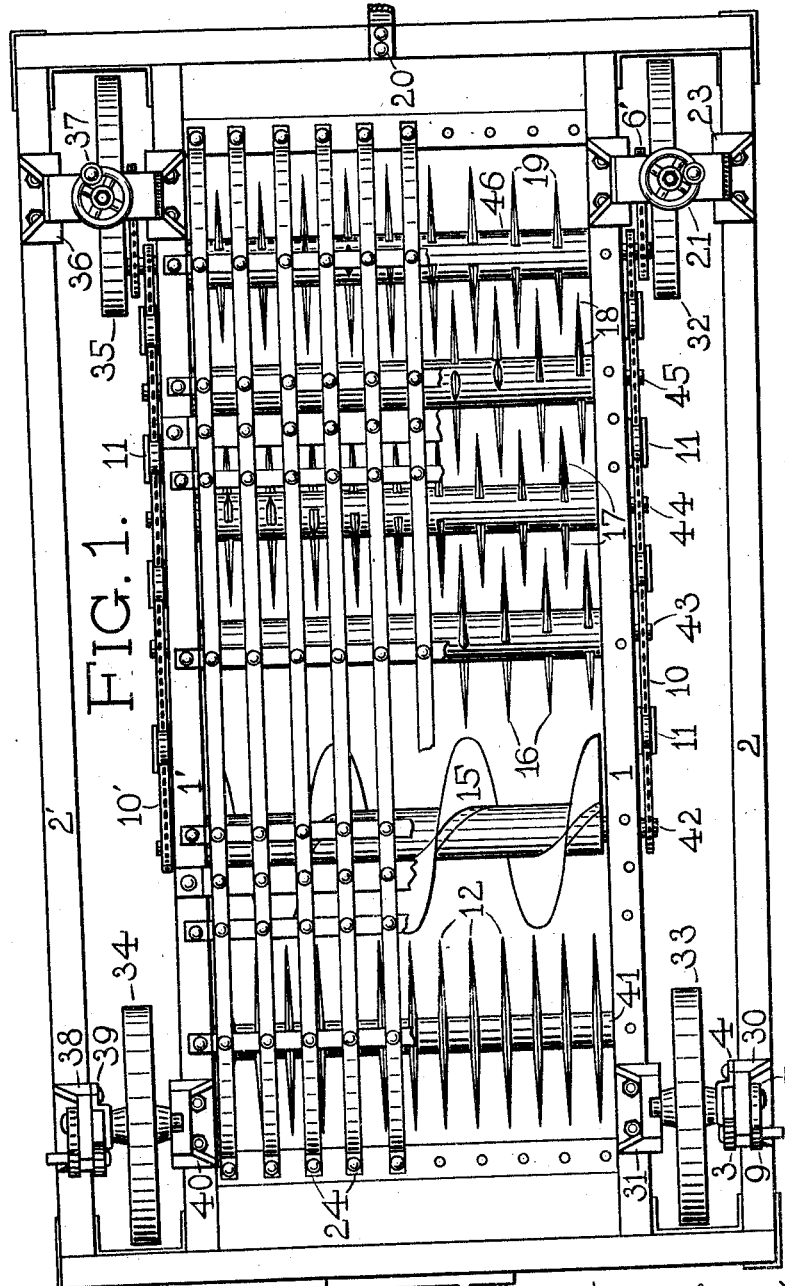
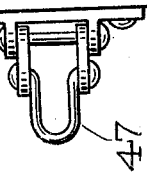
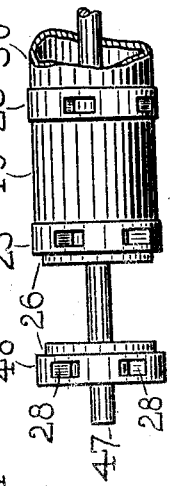
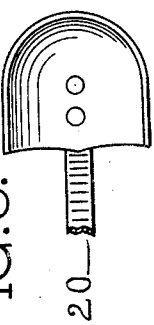
INVENTOR
Mathias E. Juopperi,
BY
Frank Carlson
ATTORNEY.

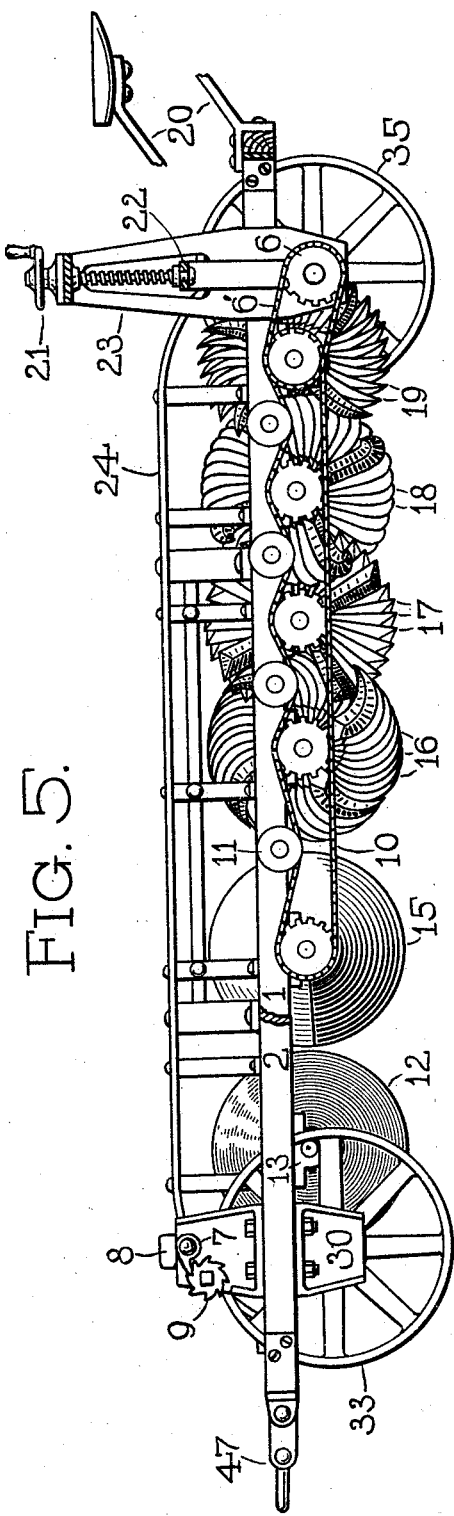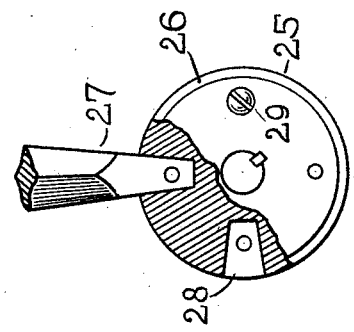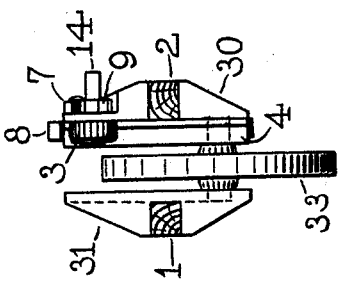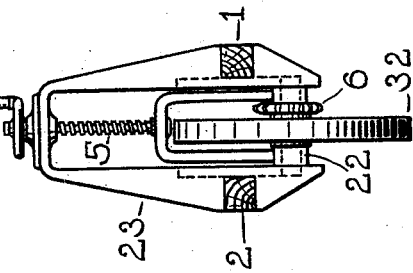

UNITED STATES PATENT OFFICE.

MATHIAS E. JUOPPERI, OF ASTORIA, OREGON.

HARROW.

1,389,512.  Specification of Letters Patent.  Patented Aug. 30, 1921.

Application filed February 13, 1920. Serial No. 358,481.

*To all whom it may concern:*

Be it known that I, MATHIAS E. JUOPPERI, a citizen of the United States, and a resident of 366 Taylor street, in the city of Astoria, county of Clatsop, and State of Oregon, have invented certain new and useful Improvements in Harrows, of which the following is a specification.

This invention relates to harrows, and especially to that class wherein a wheel supported frame is provided with a series of different rollers which may be lowered so as to cut the ground to any desired depth.

The main object of this invention is to provide a harrow which will cut up the ground quite thoroughly, rendering it immediately available for sowing.

The accompanying drawings disclose a practical form of the above mentioned invention which will be particularly described with a view to bringing out certain novel and useful features. The same reference characters refer to the same or duplicate parts in the several views.

Figure 1 is a plan view of a harrow embodying my invention with a part of the guard broken out.

Fig. 2 is a view of a rack which is a part of Fig. 1.

Fig. 3 is a fragment of Fig. 1.

Fig. 4 is an enlargement of a portion of one of the rollers of Fig. 1.

Fig. 5 is a side view of Fig. 1 with one rear wheel and its support and part of the near side of the frame broken away to better illustrate the details.

Fig. 6 is a view of part of Fig. 4, with a portion of its surface broken off and a section of a cutter added to indicate the construction.

Fig. 7 is another view of the front wheel shown in Fig. 5 with its supporting and adjusting means.

Fig. 8 is a rear view of wheel 32 with its supports and adjusting means.

The frame 1, 1' is of rectangular shape and is provided beneath both sides with several journals similar to 13.

Into these journals are fitted a set of rollers 41 to 46 inclusive. The first roller is provided with a series of cutting disks 12, 12, and, being operative by direct traction with the ground is independent of the other rollers. The other five rollers are provided with sprockets on their extremities which are engaged by the chains 10 and 10' to provide rotary movement, the rear wheels 32 and 35 being provided with driving sprockets like the one noted 6 which are connected by short chains like 6' to the extra sprockets on the last roller. Thus it will be seen that when the harrow is drawn by hitching hook 47, the rotation of the rear wheels will be communicated to all rollers except the first.

The guard 24 serves to protect the operator and also to prevent large clods from being tossed into the air when running the machine.

Referring again to the rollers, the second, 42 is provided with a flat helix 15 of sheet steel; while the third roller 43 is provided with four advancing series of sickle shaped double edged cutters 16, 16. The fourth roller has four retreating series of straight triple edged blades 17, 17; while the fifth or 45 has four advancing series of double edged straight blades 18, 18 which are very sharply turned forward at their extremities. The last roller 46 is provided with four retreating series of slightly curved cutters 19, 19. The idlers 11, 11 serve to keep the chains 10 and 10' on the sprockets.

Now in order to lower the rollers into proper operative position the following construction is provided. The frame 1, 1' has a pair of outrider beams 2 and 2' to which are secured the supports 30 and 38 of the front wheels 33 and 34, respectively, while parts 31 and 40 which are also supported by the same wheels are secured to 1 and 1' respectively. The iron frame 23 is supported by wheel 32 and is secured to parts 1 and 2, while iron frame 36 is supported by wheel 35 and is secured to parts 1' and 2'. Wheel 32 is straddled by a yoke 22, a short shaft passing through the wheel and yoke and extending into the vertical slots of frame 23 indicated by the dotted lines in Fig. 8. A handwheel 21 surmounts the whole which when rotated to the left will cause the vertical feed bar 5 to rise up through frame 23, which also raises yoke 22 and the wheel 32, while the indicated shaft of the latter will be guided upward in the vertical slots previously mentioned. The actual result is that parts 1 and 2 are lowered. If hand wheel 37 is similarly rotated, the result will be similar for parts 1' and 2'. Thus the rear of the harrow may be lowered according to necessity. In passing, it may be well to mention that the operator hardly needs to do more than lean forward from his seat to reach either hand wheel to raise or lower the rear of the machine. The seat is shown with its support 20 broken as the seat would actually extend farther to the rear than shown.

Raising or lowering the fore wheels is a different process. The vertical block 30 is attached a flat sleeve 4 in which is located a rack 8 which engages gear 3. On the same shaft with gear 3 is a ratchet 9 which may be caught at any point by pawl 7. If a suitable handle is attached to the square shaft 14, and turned, this will raise the rack 8. As the shaft on which wheel 33 rotates is secured in the hole in the lower part of rack 8, the shaft will rise with the rack and raise the wheel, the vertical slot in block 31 permitting this rise, while the pawl and ratchet prevent a return drop. The rack in sleeve 39 may be operated independently in a similar manner to raise wheel 34. This will result in lowering the fore part of the harrow.

It will now be seen that the frame 1, 1', 2 and 2' may be lowered at will to cause the cutters of all the rollers to engage the soil. The first roller will perform the initial breaking of the ground while the second scatters the clods to form a uniform layer. The cutters of the last four rollers operate to utterly macerate the clods so that the ground will be finished when the last roller has passed. The preferred order of the rollers is shown as this order seems most efficient. The different forms of cutters shown are also more satisfactory and efficient than if all the rollers were provided with the same kind of blades.

However, the inner ends of all the cutters are of the form 27 shown in Fig. 6 while their diamond shaped cross section is also evident.

The four mentioned rollers are built up of a shaft like 47 upon which are keyed a series of iron disks like 25, while 48 is an example of an extreme end disk. In these disks are a number of radial slots 28, 28 which have two convergent sides. Into each slot is fitted a blade stock as at 27 and a screw like 29 passed through to secure the same. Between the disks are fitted pieces of tubing like 49 and 50 which fit the shoulders 26, 26 and prevent soil from coming in contact with inactive parts of the rollers.

It is manifest that I may set the rollers in different relative planes or in a different order without departing from my invention, and therefore reserve all rights to any such alterations.

Having thus fully described my invention, I claim:

1. A harrow including a rectangular frame, a vertically extended frame secured to said harrow frame, a vertically arranged yoke straddling a wheel and supporting a shaft whose ends extend into vertical slots of the vertically extended frame, a vertical feed bar communicating with said yoke and passing through the upper portion of said vertical frame and a hand wheel surmounting said feed bar whereby said bar may be rotated to raise said yoke and included wheel within said vertical frame.

2. A wheel borne harrow including a series of rollers comprising a free roller provided with disks, a second roller provided with a helically arranged sheet to form a screw about said roller, a plurality of rollers provided with cutting blades, sprockets on all rollers except said free roller and upon the wheels of said harrow, and chains connecting all said sprockets to provide rotation of said rollers by the rotation of said wheels.

Signed at 132 Nassau street, in the borough of Manhattan, county of New York, city and State of New York this 9th day of February, 1920.

MATHIAS E. JUOPPERI.

Witnesses:
ELIAS JOHNSON,
GUSTAF A. JOHNSON.